(12) United States Patent
Friesen et al.

(10) Patent No.: US 8,492,052 B2
(45) Date of Patent: Jul. 23, 2013

(54) ELECTROCHEMICAL CELL WITH SPACERS FOR FLOW MANAGEMENT SYSTEM

(75) Inventors: Cody A Friesen, Fort McDowell, AZ (US); Ramkumar Krishnan, Gilbert, AZ (US); Grant Friesen, Fountain Hills, AZ (US)

(73) Assignee: Fluidic, Inc., Scottsdale, AZ (US)

( * ) Notice: Subject to any disclaimer, the term of this patent is extended or adjusted under 35 U.S.C. 154(b) by 341 days.

(21) Appl. No.: 12/901,410

(22) Filed: Oct. 8, 2010

(65) Prior Publication Data

US 2011/0086278 A1 Apr. 14, 2011

Related U.S. Application Data

(60) Provisional application No. 61/249,917, filed on Oct. 8, 2009.

(51) Int. Cl.
*H01M 8/04* (2006.01)
(52) U.S. Cl.
USPC ............ 429/512; 429/498; 429/499; 429/503
(58) Field of Classification Search
USPC ................... 429/498, 499, 503, 512; 204/242
See application file for complete search history.

(56) References Cited

U.S. PATENT DOCUMENTS

| | | |
|---|---|---|
| 2,083,364 A | 8/1934 | Cook |
| 3,223,611 A | 4/1962 | Wells et al. |
| 3,219,486 A | 11/1965 | Gumucio |
| 3,532,548 A | 10/1966 | Stachurski |
| 3,338,746 A | 8/1967 | Plust |
| 3,615,843 A | 10/1971 | Moran |
| 3,615,844 A | 10/1971 | Spengler |
| 3,650,837 A | 3/1972 | Palmer |
| 3,713,892 A | 1/1973 | Moran |
| 3,716,413 A | 2/1973 | Eisner |
| 3,717,505 A * | 2/1973 | Unkle et al. ................. 429/402 |

(Continued)

FOREIGN PATENT DOCUMENTS

| | | |
|---|---|---|
| CN | 100037 | 1/2012 |
| EP | 0058090 | 8/1982 |

(Continued)

OTHER PUBLICATIONS

International Preliminary Report on Patentability dated Jan. 23, 2012 of PCT/US2010/052099 filed Oct. 8, 2010 (14 pages).

(Continued)

*Primary Examiner* — Zachary Best
(74) *Attorney, Agent, or Firm* — Pillsbury Winthrop Shaw Pittman LLP

(57) ABSTRACT

An electrochemical cell includes a fuel electrode configured to operate as an anode to oxidize a fuel when connected to a load. An electrode holder includes a cavity for holding the fuel electrode, at least one inlet connected to the cavity on one side of the cavity and configured to supply an ionically conductive medium to the cavity, and at least one outlet connected to the cavity on an opposite side of the cavity and configured to allow the ionically conductive medium to flow out of the cavity. A plurality of spacers extend across the fuel electrode and the cavity in a spaced relation from each other to define a plurality of flow lanes in the cavity.

19 Claims, 8 Drawing Sheets

U.S. PATENT DOCUMENTS

| | | |
|---|---|---|
| 3,728,244 A | 4/1973 | Cooley |
| 3,751,351 A | 8/1973 | Zankowski |
| 3,785,868 A | 1/1974 | Devitt |
| 3,801,376 A | 4/1974 | Lindstrom |
| 3,822,149 A | 7/1974 | Hale |
| 3,840,455 A | 10/1974 | Cooley et al. |
| 3,850,696 A | 11/1974 | Summers |
| 3,886,426 A | 5/1975 | Daggett |
| 3,919,062 A | 11/1975 | Lundquist, Jr. et al. |
| 3,972,727 A | 8/1976 | Cohn |
| 4,119,772 A | 10/1978 | Peters et al. |
| 4,201,653 A | 5/1980 | O'Neill et al. |
| 4,225,411 A * | 9/1980 | Grune ............................ 204/284 |
| 4,312,927 A | 1/1982 | Salmon |
| 4,317,863 A | 3/1982 | Struthers |
| 4,340,449 A | 7/1982 | Srinivasan et al. |
| 4,385,101 A | 5/1983 | Catanzarite |
| 4,385,967 A | 5/1983 | Brady et al. |
| 4,444,852 A * | 4/1984 | Liu et al. ...................... 429/406 |
| 4,447,504 A | 5/1984 | Goebel |
| 4,461,817 A | 7/1984 | Itoh et al. |
| 4,521,497 A | 6/1985 | Tamminen |
| 4,581,064 A | 4/1986 | Morrison et al. |
| 4,684,585 A | 8/1987 | Tamminen |
| 4,693,946 A | 9/1987 | Niksa et al. |
| 4,732,823 A | 3/1988 | Ito et al. |
| 4,871,627 A | 10/1989 | Strong et al. |
| 5,009,755 A | 4/1991 | Shor |
| 5,104,497 A | 4/1992 | Tetzlaff et al. |
| 5,185,218 A | 2/1993 | Brokman et al. |
| 5,190,833 A | 3/1993 | Goldstein et al. |
| 5,318,861 A | 6/1994 | Harats et al. |
| 5,376,471 A | 12/1994 | Hunter et al. |
| 5,415,949 A | 5/1995 | Stone et al. |
| 5,431,823 A | 7/1995 | Gofer |
| 5,434,020 A | 7/1995 | Cooper |
| 5,439,758 A | 8/1995 | Stone et al. |
| 5,458,988 A | 10/1995 | Putt |
| 5,567,540 A | 10/1996 | Stone et al. |
| 5,650,240 A | 7/1997 | Rogers |
| 5,652,068 A | 7/1997 | Shuster et al. |
| 5,733,677 A | 3/1998 | Golovin et al. |
| 5,850,136 A | 12/1998 | Kaneko |
| 5,935,724 A | 8/1999 | Spillman |
| 5,935,728 A | 8/1999 | Spillman |
| 5,938,899 A | 8/1999 | Forand |
| 5,972,531 A | 10/1999 | Kawakami |
| 5,998,967 A | 12/1999 | Umeki |
| 6,014,013 A | 1/2000 | Suppanz |
| 6,025,696 A | 2/2000 | Lenhart |
| 6,027,834 A | 2/2000 | Hayashi |
| 6,034,506 A | 3/2000 | Hall |
| 6,046,514 A | 4/2000 | Rouillard |
| 6,054,840 A | 4/2000 | Nakanishi |
| 6,057,052 A | 5/2000 | Shrim et al. |
| 6,091,230 A | 7/2000 | Winzer |
| 6,121,752 A | 9/2000 | Kitahara |
| 6,127,061 A | 10/2000 | Shun |
| 6,153,328 A | 11/2000 | Colborn |
| 6,162,555 A | 12/2000 | Gutierrez et al. |
| 6,165,638 A | 12/2000 | Spillman |
| 6,207,037 B1 | 3/2001 | Dartnell et al. |
| 6,211,650 B1 | 4/2001 | Mumaw |
| 6,265,846 B1 | 7/2001 | Flechsig |
| 6,271,646 B1 | 8/2001 | Evers |
| 6,277,508 B1 | 8/2001 | Reiser et al. |
| 6,355,369 B1 | 3/2002 | Iarochenko et al. |
| 6,379,828 B1 | 4/2002 | Worth |
| 6,383,673 B1 | 5/2002 | Faris et al. |
| 6,383,675 B1 | 5/2002 | Zhong |
| 6,410,174 B1 | 6/2002 | Faris |
| 6,458,480 B1 | 10/2002 | Morris et al. |
| 6,465,638 B2 | 10/2002 | Gorman |
| 6,472,093 B2 | 10/2002 | Faris et al. |
| 6,541,941 B2 | 4/2003 | Adams |
| 6,544,678 B2 | 4/2003 | Faris et al. |
| 6,558,830 B2 | 5/2003 | Faris et al. |
| 6,562,494 B1 | 5/2003 | Tsai |
| 6,562,504 B2 | 5/2003 | Faris et al. |
| 6,566,000 B1 | 5/2003 | Iarochenko et al. |
| 6,569,555 B1 | 5/2003 | Faris et al. |
| 6,579,637 B1 | 6/2003 | Savage et al. |
| 6,586,909 B1 | 7/2003 | Trepka |
| 6,641,943 B1 | 11/2003 | Faris et al. |
| 6,646,418 B1 | 11/2003 | Xie |
| 6,649,294 B2 | 11/2003 | Faris et al. |
| 6,673,490 B2 | 1/2004 | Miki |
| 6,677,077 B2 | 1/2004 | Spillman |
| 6,706,433 B2 | 3/2004 | Pinto et al. |
| 6,713,206 B2 | 3/2004 | Markoski et al. |
| 6,756,149 B2 | 6/2004 | Knights et al. |
| 6,762,587 B1 | 7/2004 | Barbetta |
| 6,764,588 B2 | 7/2004 | Smedley et al. |
| 6,787,260 B2 | 9/2004 | Smedley et al. |
| 6,802,946 B2 | 10/2004 | Basol et al. |
| 6,811,903 B2 | 11/2004 | Vartak et al. |
| 6,822,423 B2 | 11/2004 | Yau |
| 6,855,455 B1 | 2/2005 | Berger et al. |
| 6,858,347 B2 | 2/2005 | Tanigawa |
| 6,866,950 B2 | 3/2005 | Connor et al. |
| 6,902,602 B2 | 6/2005 | Keefer et al. |
| 6,911,274 B1 | 6/2005 | Colborn et al. |
| 6,942,105 B2 | 9/2005 | Smedley et al. |
| 6,967,064 B2 | 11/2005 | Haltiner, Jr. et al. |
| 6,986,964 B2 | 1/2006 | Faris |
| 7,020,355 B2 | 3/2006 | Lahann et al. |
| 7,126,310 B1 | 10/2006 | Barron |
| 7,201,857 B2 | 4/2007 | Ovshinsky |
| 7,226,676 B2 | 6/2007 | Faris et al. |
| 7,252,898 B2 | 8/2007 | Markoski et al. |
| 7,270,906 B2 | 9/2007 | Haltiner, Jr. et al. |
| 7,273,541 B2 | 9/2007 | Choban et al. |
| 7,276,309 B2 | 10/2007 | Smedley et al. |
| 7,279,245 B1 | 10/2007 | Clark |
| 7,291,186 B2 | 11/2007 | Zhang et al. |
| 7,466,104 B2 | 12/2008 | Wang |
| 7,468,221 B2 | 12/2008 | Lafollette |
| 7,482,081 B2 | 1/2009 | Hong |
| 7,488,547 B1 | 2/2009 | Iacovelli |
| 7,535,199 B2 | 5/2009 | Kimura |
| 7,598,706 B2 | 10/2009 | Koski |
| 7,670,575 B2 | 3/2010 | Järvinen et al. |
| 7,670,705 B2 | 3/2010 | Ueda et al. |
| 7,670,724 B1 | 3/2010 | Chan et al. |
| 7,722,988 B2 | 5/2010 | Webber |
| 8,058,165 B2 | 11/2011 | Kawano |
| 8,309,259 B2 * | 11/2012 | Friesen et al. ................. 429/402 |
| 2001/0007725 A1 | 7/2001 | Faris et al. |
| 2002/0015871 A1 | 2/2002 | Tao |
| 2002/0045075 A1 | 4/2002 | Pinto et al. |
| 2002/0076602 A1 | 6/2002 | Finkelshtain et al. |
| 2002/0098398 A1 | 7/2002 | Chen |
| 2002/0142203 A1 | 10/2002 | Ma |
| 2002/0146600 A1 | 10/2002 | Vartak |
| 2003/0054217 A1 | 3/2003 | Faris |
| 2003/0099882 A1 | 5/2003 | Hampden-Smith et al. |
| 2003/0143446 A1 | 7/2003 | Faris et al. |
| 2003/0165727 A1 | 9/2003 | Priestnall et al. |
| 2003/0190504 A1 | 10/2003 | Fisher et al. |
| 2003/0198862 A1 | 10/2003 | Struthers |
| 2004/0005488 A1 | 1/2004 | Faris et al. |
| 2004/0023112 A1 | 2/2004 | Lin |
| 2004/0053132 A1 | 3/2004 | Smedley et al. |
| 2004/0058203 A1 | 3/2004 | Priestnall et al. |
| 2004/0058217 A1 | 3/2004 | Ohlsen et al. |
| 2004/0146764 A1 | 7/2004 | Tsai et al. |
| 2004/0157101 A1 | 8/2004 | Smedley |
| 2004/0175603 A1 | 9/2004 | Yang et al. |
| 2004/0180246 A1 | 9/2004 | Smedley |
| 2004/0185328 A1 | 9/2004 | Lin |
| 2004/0225249 A1 | 11/2004 | Leonard et al. |
| 2004/0229107 A1 | 11/2004 | Smedley |
| 2004/0247969 A1 | 12/2004 | Faris et al. |
| 2005/0019634 A1 | 1/2005 | Legg |
| 2005/0019651 A1 | 1/2005 | Tsai et al. |
| 2005/0031911 A1 | 2/2005 | Venkatesan et al. |
| 2005/0084737 A1 | 4/2005 | Wine et al. |

| | | |
|---|---|---|
| 2005/0123815 A1 | 6/2005 | Tsai et al. |
| 2005/0170245 A1 | 8/2005 | Vartak et al. |
| 2005/0233191 A1 | 10/2005 | Ushio |
| 2006/0003217 A1 | 1/2006 | Cohen et al. |
| 2006/0038536 A1 | 2/2006 | Lafollette |
| 2006/0127731 A1 | 6/2006 | Faris |
| 2006/0210867 A1 | 9/2006 | Kenis et al. |
| 2006/0234855 A1 | 10/2006 | Gorte et al. |
| 2006/0292407 A1 | 12/2006 | Gervasio et al. |
| 2007/0077491 A1 | 4/2007 | Burchardt |
| 2007/0092787 A1 | 4/2007 | Wang Chen |
| 2007/0120091 A1 | 5/2007 | Ovshinsky |
| 2007/0141415 A1 | 6/2007 | Yang et al. |
| 2007/0141430 A1 | 6/2007 | Huang et al. |
| 2007/0141432 A1 | 6/2007 | Wang et al. |
| 2007/0141450 A1 | 6/2007 | Yang et al. |
| 2007/0154766 A1 | 7/2007 | Baik et al. |
| 2007/0166602 A1 | 7/2007 | Burchardt |
| 2007/0184314 A1 | 8/2007 | Kagami |
| 2007/0224500 A1 | 9/2007 | White et al. |
| 2007/0234900 A1 | 10/2007 | Soloveichik et al. |
| 2007/0237993 A1 | 10/2007 | Carlsson |
| 2007/0248868 A1 | 10/2007 | Haltiner, Jr. et al. |
| 2007/0259234 A1 | 11/2007 | Chua et al. |
| 2007/0264550 A1 | 11/2007 | Zhang et al. |
| 2007/0269695 A1 | 11/2007 | Yamazaki et al. |
| 2007/0278107 A1 | 12/2007 | Barnett et al. |
| 2008/0008911 A1 | 1/2008 | Stroock et al. |
| 2008/0026265 A1 | 1/2008 | Markoski et al. |
| 2008/0044721 A1 | 2/2008 | Heller et al. |
| 2008/0145719 A1 | 6/2008 | Yang et al. |
| 2008/0145721 A1 | 6/2008 | Shapiro et al. |
| 2008/0145737 A1 | 6/2008 | Cai et al. |
| 2008/0154101 A1 | 6/2008 | Jain et al. |
| 2008/0231231 A1 | 9/2008 | Hartzog |
| 2008/0241617 A1 | 10/2008 | Sato |
| 2008/0252257 A1 | 10/2008 | Sufrin-Disler |
| 2008/0268341 A1 | 10/2008 | Zhang |
| 2009/0027006 A1 | 1/2009 | Vezzini |
| 2009/0081488 A1 | 3/2009 | Sato et al. |
| 2009/0117429 A1 | 5/2009 | Zillmer et al. |
| 2009/0167242 A1 | 7/2009 | Naganuma |
| 2009/0230921 A1 | 9/2009 | Hsu |
| 2009/0284229 A1 | 11/2009 | Friesen |
| 2009/0286149 A1 | 11/2009 | Ci |
| 2009/0305090 A1 | 12/2009 | Chuang |
| 2010/0062303 A1 | 3/2010 | Bae |
| 2010/0119883 A1 | 5/2010 | Friesen |
| 2010/0119895 A1 | 5/2010 | Friesen |
| 2010/0285375 A1 | 11/2010 | Friesen |
| 2010/0316935 A1 | 12/2010 | Friesen |
| 2011/0039181 A1 | 2/2011 | Friesen |
| 2011/0044528 A1 | 2/2011 | Tsuchiya |
| 2011/0070506 A1 | 3/2011 | Friesen |
| 2011/0086278 A1 | 4/2011 | Friesen |
| 2011/0189551 A1 | 8/2011 | Friesen |
| 2011/0200893 A1 | 8/2011 | Friesen |
| 2011/0250512 A1 | 10/2011 | Friesen |
| 2011/0305959 A1 | 12/2011 | Friesen |
| 2011/0316485 A1 | 12/2011 | Krishnan |
| 2012/0015264 A1 | 1/2012 | Friesen |
| 2012/0068667 A1 | 3/2012 | Friesen |

FOREIGN PATENT DOCUMENTS

| | | |
|---|---|---|
| EP | 0277937 A1 | 8/1988 |
| EP | 0589 144 B1 | 10/1996 |
| GB | 1286173 A1 | 8/1972 |
| WO | WO8905528 | 6/1989 |
| WO | 2008058165 | 5/2008 |
| WO | 2010065890 A1 | 6/2010 |
| WO | 2011012364 A1 | 2/2011 |
| WO | 2011035176 | 3/2011 |
| WO | 2011044528 | 4/2011 |
| WO | 2011163553 A1 | 12/2011 |

OTHER PUBLICATIONS

International Search Report and Written Opinion for PCT International Patent Application No. PCT/US2009/039460, mailed on May 26, 2009.

International Search Report and Written Opinion for PCT International Patent Application No. PCT/US2009/040658, mailed on Aug. 24, 2009.

International Preliminary Report on Patentability for International Patent Application No. PCT/US2009/040658, mailed on Dec. 2, 2010.

International Search Report and Written Opinion for PCT International Patent Application No. PCT/US2010/052099 mailed on Jan. 27, 2011.

Cherepy et al., "A Zinc/Air Fuel Cell for Electric Vehicles", IEEE publication, 1999, pp. 11-13.

Cohen et al., "Fabrication and preliminary testing of a planar membraneless microchannel fuel cell," J. Power Sources, 2005,139, 96-105.

Ferrigno et al., "Membraneless Vanadium Redox Fuel Cell Using Laminar Flow," J. Am. Chem. Soc. 2002, 124, pp. 12930-12931.

Jayashree et al., "Air-Breathing Laminar Flow-Based Microfluidic Fuel Cell," J. Am. Chem. Soc., 2005, 127, pp. 16758-16759.

Salloum et al., Sequential flow membraneless microfluidic fuel cell with porous electrodes, Journal of Power Sources 180, 2008, pp. 243-252.

Smedley et al., "A regenerative zinc-air fuel cell", Journal of Power Sources, vol. 165, 2007, pp. 897-904.

Jorne et al. "Journal of the Electrochemical Society," vol. 134 No. 6, pp. 1399-1402 (Jun. 1987).

Thirsk (Electrochemistry vol. 4 p. 16, Thirsk, ed. The Chemical Society Great Britain Oxford Alden Press 1974).

* cited by examiner

ELECTROCHEMICAL CELL WITH SPACERS FOR FLOW MANAGEMENT SYSTEM

CROSS-REFERENCE TO RELATED APPLICATIONS

This application claims the benefit of priority from U.S. Provisional Patent Application Ser. No. 61/249,917, filed Oct. 8, 2009, the entire content of which is incorporated herein by reference.

FIELD

The present invention is generally related to an electrochemical cell, and more particularly to a metal-air cell.

BACKGROUND

Electrochemical cells using metal as the fuel are known. Examples of such devices are shown, for example, in U.S. Pat. Nos. 7,276,309; 6,942,105; 6,911,274 and 6,787,260, which are incorporated herein in their entirety. A short list of disadvantages of these previous embodiments includes: the buildup of precipitated reaction products in the anode space and the cathode space, issues related to the feed of the solid particle fuel, the sluggish rate of net oxidation of the fuel due to the increased concentration of oxidized fuel in the vicinity of the as yet unoxidized fuel.

A metal-air cell typically comprises an anode at which metal fuel is oxidized, an air breathing cathode at which oxygen from ambient air is reduced, and an electrolyte for supporting reactions of the oxidized/reduced ions.

The present application also endeavors to provide an effective and improved way of managing the fluid flow, which may include fuel particles and/or precipitates, while charging or re-charging the cell.

SUMMARY

According to an aspect of the present invention, there is provided an electrochemical cell that includes a fuel electrode, an oxidant electrode spaced from the fuel electrode, and an ionically conductive medium contacting the electrodes. The fuel electrode and the oxidant electrode are configured to, during discharge, oxidize a metal fuel at the fuel electrode and reduce an oxidant at the oxidant electrode to generate a discharge potential difference therebetween for application to a load. The electrochemical cell also includes an electrode holder including a cavity for holding the fuel electrode, at least one inlet connected to the cavity on one side of the cavity and configured to supply the ionically conductive medium to the cavity, and at least one outlet connected to the cavity on an opposite side of the cavity as the at least one inlet and configured to allow the ionically conductive medium to flow out of the cavity. The electrochemical cell also includes a plurality of spacers extending across the fuel electrode and the cavity in a spaced relation from each other to define a plurality of flow lanes in the cavity so that the ionically conductive medium flows into each flow lane via the at least one inlet, across the fuel electrode, and out of the flow lane via the at least one outlet.

According to an aspect of the present invention, there is provided a method for manufacturing a fuel electrode for an electrochemical cell. The fuel electrode includes a plurality of permeable electrode bodies, and a plurality of substantially parallel spacers extending between the permeable electrode bodies. The method includes injecting a material into a plurality of cavities, each cavity being defined by two manufacturing spacers, the adjacent permeable electrode bodies being held substantially parallel to and spaced from each other with the manufacturing spacers therebetween so that the electrode bodies extend into the cavities, the manufacturing spacers being substantially parallel to each other, hardening the material to form the substantially parallel spacers of the fuel electrode, and separating the permeable electrode bodies from the manufacturing spacers so that the permeable electrode bodies and the substantially parallel spacers formed from the material are a single integral unit.

According to an aspect of the present invention, there is provided a method for charging an electrochemical cell. The electrochemical cell includes a fuel electrode, an oxidant electrode spaced from the fuel electrode, a charging electrode, and an ionically conductive medium contacting the electrodes. The fuel electrode and the oxidant electrode are configured to, during discharge, oxidize a metal fuel at the fuel electrode and reduce an oxidant at the oxidant electrode to generate a discharge potential difference therebetween for application to a load. The fuel electrode and the charging electrode are configured to, during re-charge, reduce a reducible species of the fuel to electrodeposit the fuel on the fuel electrode and oxidize an oxidizable species of the oxidant by application of a re-charge potential difference therebetween from a power source. The electrochemical cell also includes an electrode holder including a cavity for holding the fuel electrode, at least one inlet connected to the cavity on one side of the cavity and configured to supply the ionically conductive medium to the cavity, and at least one outlet connected to the cavity on an opposite side of the cavity as the at least one inlet and configured to allow the ionically conductive medium to flow out of the cavity. The electrochemical cell also includes a plurality of spacers extending across the fuel electrode and the cavity in a spaced relation from each other to define a plurality of flow lanes in the cavity so that the ionically conductive medium flows into each flow lane via the at least one inlet, across the fuel electrode, and out of the flow lane via the at least one outlet. The method includes flowing the ionically conductive medium comprising reducible fuel species through the at least one inlet and into the flow lanes, applying an electrical current between the charging electrode and the fuel electrode with the charging electrode functioning as an anode and the fuel electrode functioning as a cathode, such that the reducible fuel species are reduced and electrodeposited as fuel in oxidizable form on the fuel electrode, and removing the electrical current to discontinue the charging.

Other aspects of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
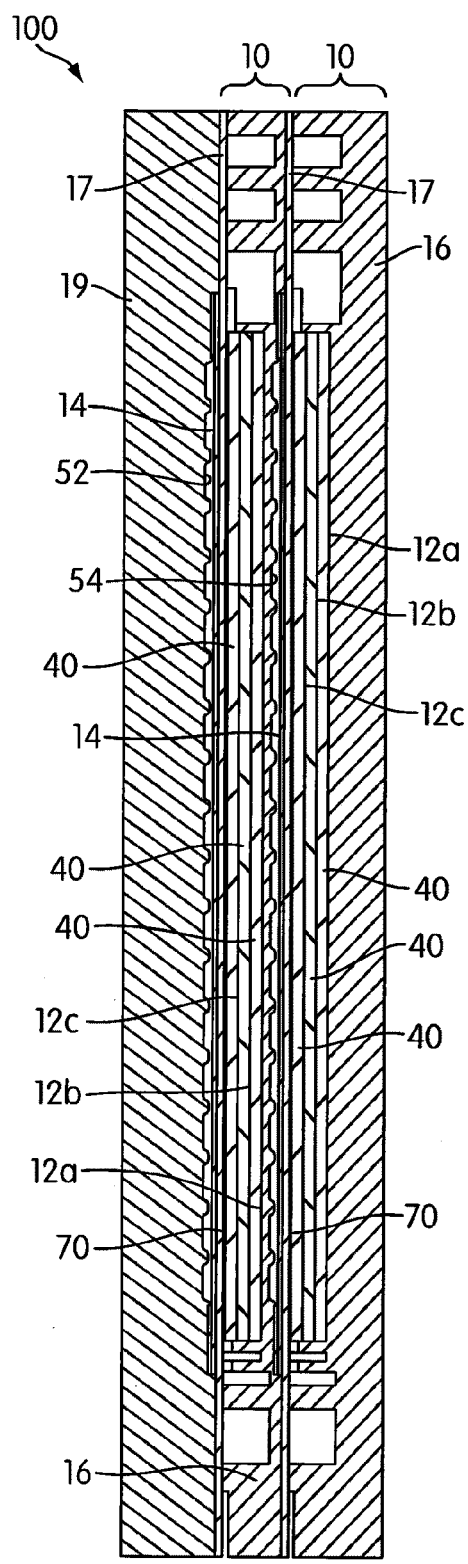
FIG. 1 illustrates a cross-sectional view of an electrochemical cell system that includes two electrochemical cells.
Figure 2:
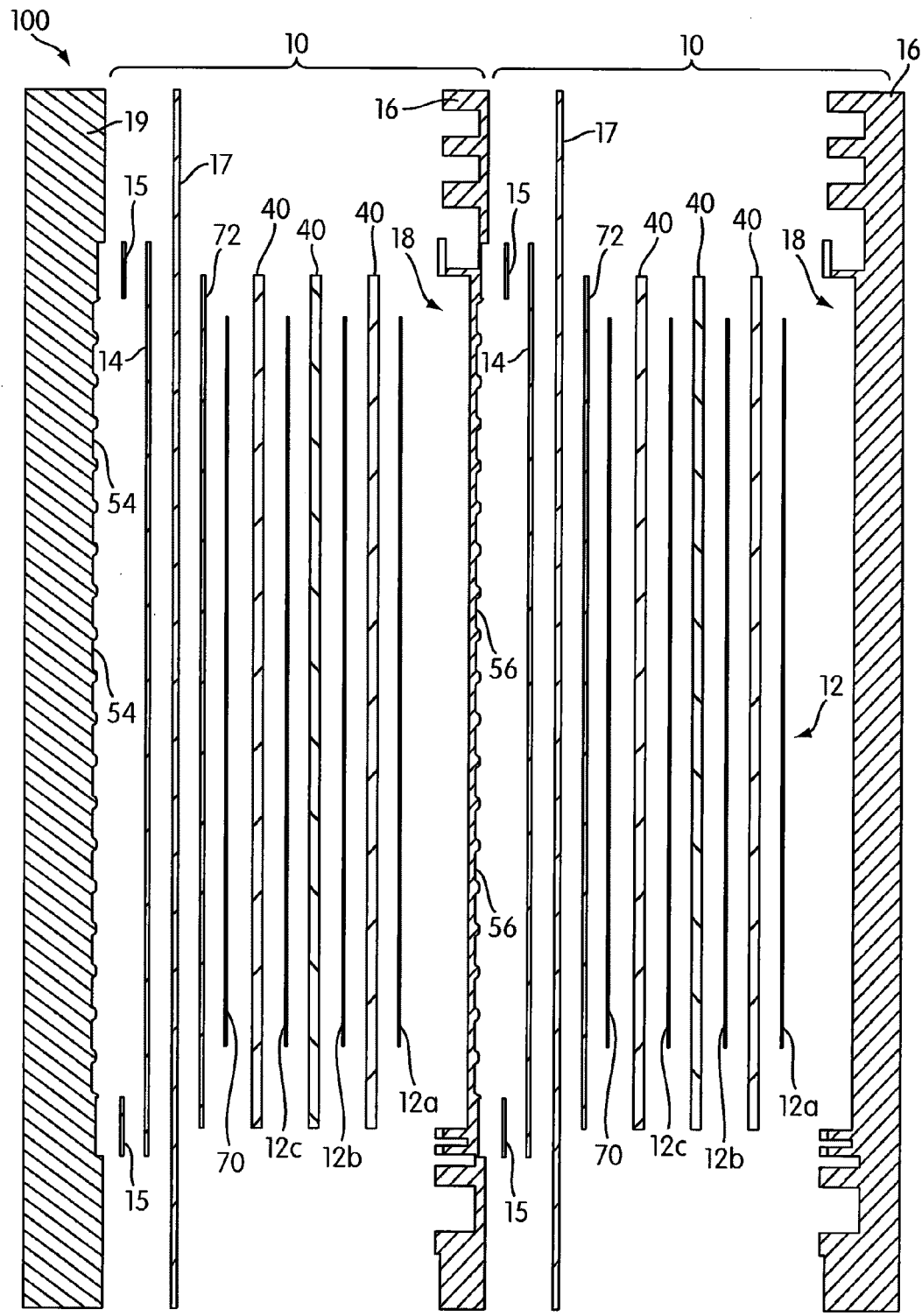
FIG. 2 illustrates an exploded view of the electrochemical cell system of FIG. 1.

FIGS. 1 and 2 illustrate an electrochemical cell system 100 that includes two electrochemical cells 10 according to an embodiment of the invention. As illustrated, each cell 10 includes a first electrode 12, and a second electrode 14 that is spaced from the first electrode 12. The first electrode 12 supported by an electrode holder 16. The electrochemical system 100 also includes a cover 19 that is used to cover the electrochemical cells 10 on one side of the system 100, while one of the electrode holders 16 is used to cover the opposite side of the system 100, as illustrated in FIG. 1.

In an embodiment, the first electrode 12 is a metal fuel electrode that functions as an anode when the cell 10 operates in discharge, or electricity generating, mode, as discussed in further detail below. In an embodiment, the first electrode 12 may comprise a permeable electrode body 12a, such as a screen that is made of any formation able to capture and retain, through electrodepositing, or otherwise, particles or ions of metal fuel from an ionically conductive medium that circulates in the cell 10, as discussed in further detail below.

Components of the cell 10, including for example, the first electrode 12, the permeable electrode body 12a thereof, and the second electrode 14, may be of any suitable construction or configuration, including but not limited to being constructed of nickel or nickel alloys (including nickel-cobalt, nickel-iron, nickel-copper (i.e. Monel), or superalloys), copper or copper alloys, brass, bronze, or any other suitable metal. In an embodiment, a catalyst film may be applied to the first electrode 12 and/or the oxidant electrode 14, and have a high surface material that may be made of some of the materials described above. In an embodiment, the catalyst film may be formed by techniques such as thermal spray, plasma spray, electrodeposition, or any other particle coating method.

The fuel may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic, molecular (including metal hydrides), or alloy form when collected on the electrode body. However, the present invention is not intended to be limited to any specific fuel, and others may be used. The fuel may be provided to the cell 10 as particles suspended in the ionically conductive medium. In some embodiments, a metal hydride fuel may be utilized in the cell 10.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. The medium may also use a non-aqueous solvent or an ionic liquid. In the non-limiting embodiment described herein, the medium is aqueous potassium hydroxide. In an embodiment, the ionically conductive medium may comprise an electrolyte. For example, a conventional liquid or semi-solid electrolyte solution may be used, or a room temperature ionic liquid may be used, as mentioned in U.S. patent application Ser. No. 12/776,962, filed May 10, 2010, the entire content of which is incorporated herein by reference. In an embodiment where the electrolyte is semi-solid, porous solid state electrolyte films (i.e. in a loose structure) may be utilized.

The fuel may be oxidized at the first electrode 12 when the first electrode 12 is operating as an anode, and an oxidizer, such as oxygen, may be reduced at the second electrode 14 when the second electrode 14 is operating as a cathode, which is when the cell 10 is connected to a load and the cell 10 is in discharge or electricity generation mode, as discussed in further detail below. The reactions that occur during discharge mode may generate by-products, e.g., precipitates including reducible fuel species, in the ionically conductive medium. For example, in embodiments where the fuel is zinc, zinc oxide may be generated as a by-product precipitate/reducible fuel species. The oxidized zinc or other metal may also be supported by, oxidized with or solvated in the electrolyte solution, without forming a precipitate (e.g. zincate may be a dissolved reducible fuel species remaining in the fuel). During a recharge mode, which is discussed in further detail below, the reducible fuel species, e.g., zinc oxide, may be reversibly reduced and deposited as the fuel, e.g., zinc, onto the first electrode 12, which functions as a cathode during recharge mode. During recharge mode, either the second electrode 14, or a separate charging electrode 70, described below, functions as the anode. The switching between discharge and recharge modes is discussed in further detail below.

Figure 3:
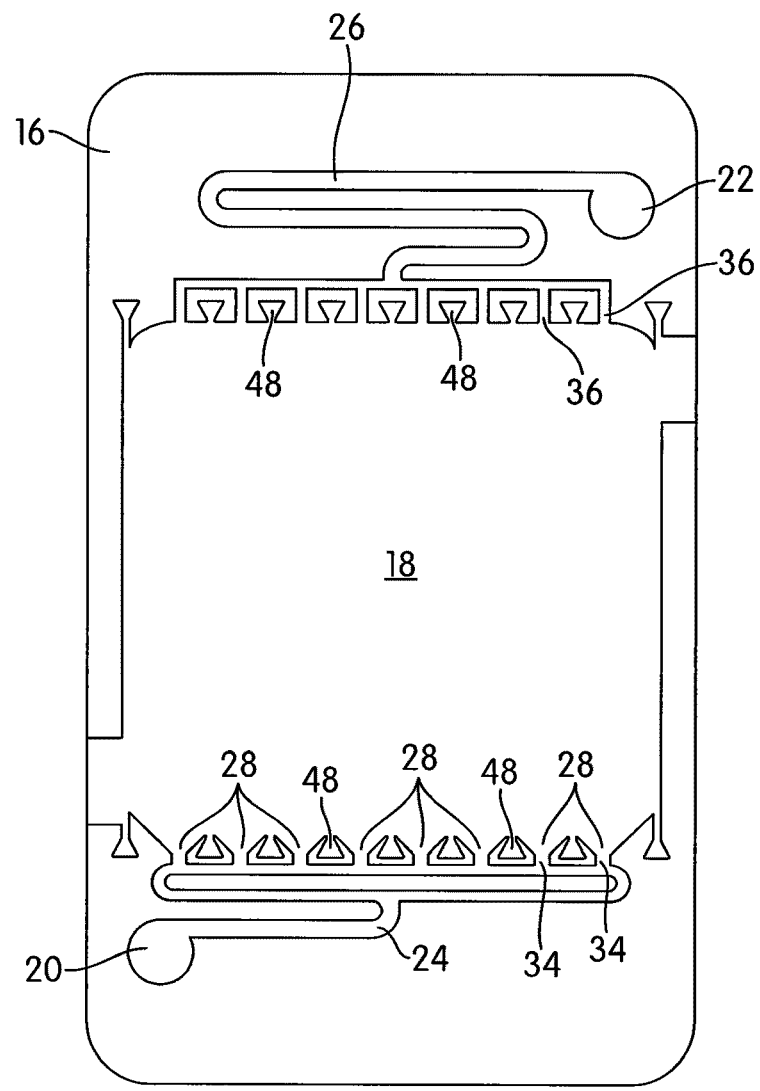
FIG. 3 illustrates an electrode holder of one of the electrochemical cells of FIG. 1.

The electrode holder 16 defines a cavity 18 in which the first electrode 12 is held. The electrode holder 16 also defines an inlet 20 and an outlet 22 for the cell 10. The inlet 20 is configured to allow the ionically conductive medium to enter the cell 10 and/or recirculate through the cell 10. The inlet 20 may be connected to the cavity 18 via an inlet channel 24, and the outlet 22 may be connected to the cavity 18 via an outlet channel 26. As illustrated in FIG. 3, the inlet channel 24 and the outlet channel 26 may each provide a meandering tortuous path through which the ionically conductive medium may flow. The meandering path defined by the inlet channel 24 preferably does not include any sharp corners in which the flow of the medium may become stagnated or in which any particulates in the medium may collect. As discussed in further detail below, the length of the channels 24, 26 may be designed to provide an increased ionic resistance between cells that are fluidly connected in series.

For each cell 10, a permeable seal member 17 may be bonded between sealing surfaces on the electrode holders 16 and/or the cover 19, as appropriate, to enclose at least the first electrode 12 in the cavity 18. The seal member 17 also covers the inlet and outlet channels 24, 26. The seal member 17 is non-conductive and electrochemically inert, and is preferably designed to be permeable to the ionically conductive medium in the orthogonal direction (i.e., through its thickness), without permitting lateral transport of the ionically conductive medium. This enables the ionically conductive medium to permeate through the seal member 17 for enabling ion conductivity with the second electrode 14 on the opposing side to support the electrochemical reactions, without "wicking" the ionically conductive medium laterally outwardly from the cell 10. A few non-limiting examples of a suitable material for the seal member 17 are EPDM and TEFLON®.

In the illustrated embodiment, the cavity 18 has a generally rectangular, or square, cross-section that substantially matches the shape of the first electrode 12. One side of the cavity 18, specifically, the side of the cavity 18 that is connected to the inlet channel 24, includes a plurality of fluidization zones 28 that are each connected to the inlet channel 24 via a manifold that includes a plurality of cavity inlets 34 so that when the ionically conductive medium and any fuel particulates, precipitates, or reducible fuel species enter the cavity 18, the ionically conductive medium and fuel enter the fluidization zones 28. As shown in greater detail in FIG. 7, each fluidization zone 28 is partially defined by two surfaces 30, 32 that are angled with respect to each other but do not touch each other so as to define diverging surfaces with respect to an axis that extends from the inlet 34 through the center of the fluidization zone 28. In the illustrated embodiment, the surfaces 30, 32 substantially define a "V" with an open bottom that is open to the inlet 34, as illustrated in FIG. 3. Although the illustrated embodiment shows the surfaces 30, 32 as being relatively straight, the surfaces may be curved or partially curved, so long as the surfaces 30, 32 are diverging from the inlet 34.

Figure 7:
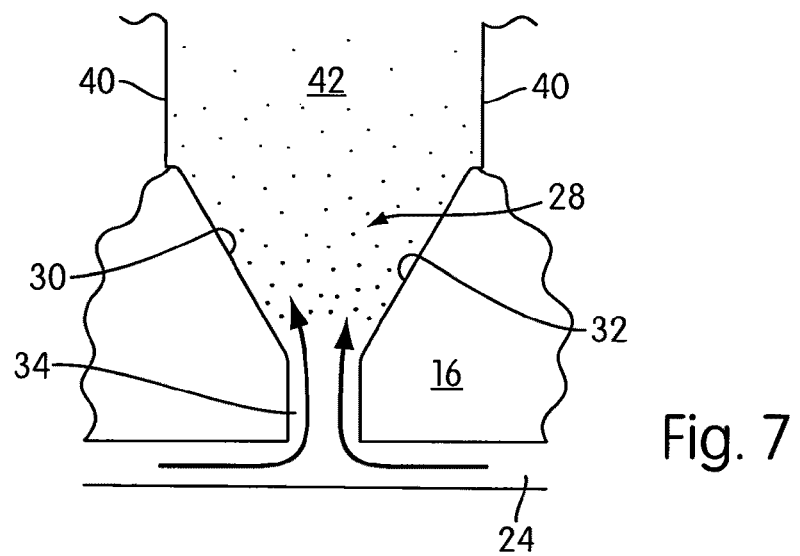
FIG. 7 illustrates a fluidization zone defined in part by the electrode holder of FIG. 3 in greater detail.

The fluidization zones 28 are configured so that as the ionically conductive medium with particulates flows into the cavity 18 via the inlet channel 24, the particulates are fluidized in the ionically conductive medium, which allows for the particulates to be more evenly dispersed in the ionically conductive medium as the ionically conductive medium contacts the first electrode 12. This is particularly advantageous when the electrochemical cell 10 is oriented with the open bottom of the V-shaped fluidization zones 28 is pointed downward, as illustrated in FIG. 7. This is because gravity will tend to cause the particulates to accumulate at the inlet end of the cavity 18 between the inlet channel 24 and the outlet channel 26. By fluidizing the particulates in the ionically conductive medium, and by providing a pressure drop across the cavity 18, as discussed in further detail below, the particulates will flow more evenly across the cavity 18, with substantially less or no accumulation at the inlet end of the cavity 18. This may improve the efficiency of the cell 10 by providing a more even distribution of the particulates across the surface of the first electrode 12.

Figure 4:
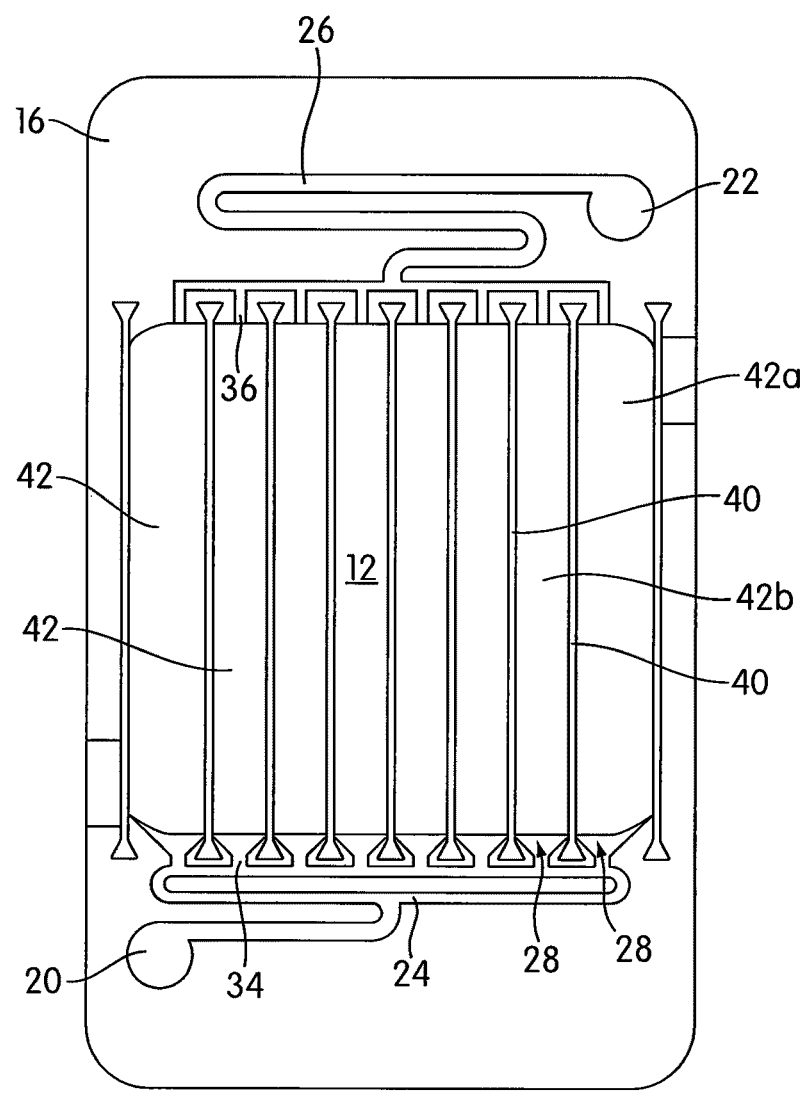
FIG. 4 illustrates the electrode holder of FIG. 3 holding a first electrode and a plurality of spacers connected to the electrode holder.

As illustrated in FIG. 4, a plurality of spacers 40, each of which extends across the first electrode 12 in a spaced relation to each other, may be connected to the electrode holder 16 so that the first electrode 12 may be held in place relative to the electrode holder 16 and to the second electrode 14. In an embodiment, the first electrode 12 may contain a plurality of permeable electrode bodies 12a-12c, as illustrated in FIG. 2 that may be separated by sets of the plurality of spacers 40, so that each set of spacers 40 is positioned in between adjacent electrode bodies to electrically isolate the electrode bodies 12a-12c from each other. Within each set of spacers 40 between adjacent electrode bodies, the spacers 40 are positioned in a spaced relation in a manner that creates so-called "flow lanes" 42 therebetween, as discussed in greater detail below. The flow lanes 42 are three-dimensional and have a height that is substantially equal to the height of the spacers 40. In an embodiment, the spacers may be provided by a single frame that has cut-outs corresponding to the flow lanes. In an embodiment, the flow lanes may include a foam or honeycomb-type structure that is configured to allow the ionically conductive medium to flow therethrough. In an embodiment, the flow lanes may include an array of pins that are configured to disrupt the flow of the ionically conductive medium through the flow lanes. In an embodiment, the frame, spacers, flow lanes, and/or other elements of the cell may be defined by plastic formed by injection molding, or epoxy/insulating material formed using chemical processes, as discussed in further detail below. The illustrated embodiment is not intended to by limiting in any way.

In an embodiment, the permeable electrode bodies 12a-12c may have substantially the same size. In an embodiment, the permeable electrode bodies may have different sizes so that a stepped scaffold configuration may be used, as described by U.S. Provisional Patent Application Ser. No. 61/358,339, filed Jun. 24, 2010, the entire content of which is incorporated herein by reference.

The spacers 40 are non-conductive and electrochemically inert so they are inactive with regard to the electrochemical reactions in the cell 10. The spacers 40 are preferably sized so that when they are connected to the electrode holder 16, the spacers 40 are in tension, which allows the spacers 40 to press against the first electrode 12, or one of the electrode bodies 12a-12c, so as to hold the first electrode 12 or bodies thereof in a flat relation relative to the electrode holder 16. The spacers 40 may be made from a plastic material, such as polypropylene, polyethylene, noryl, fluoropolymer, etc. that allows the spacers 40 to be connected to the electrode holder 16 in tension.

Figure 5:
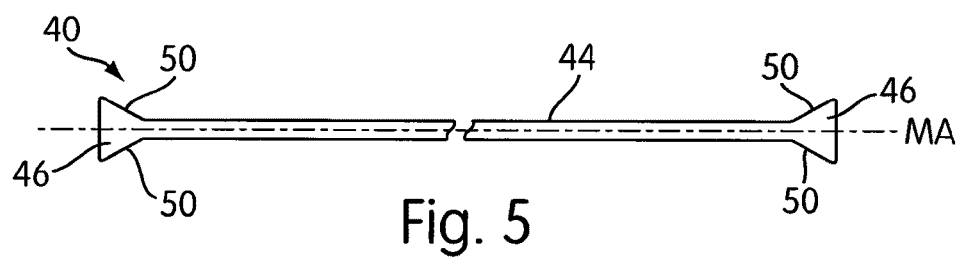
FIG. 5 illustrates one of the spacers of FIG. 4 in greater detail.
Figure 6:
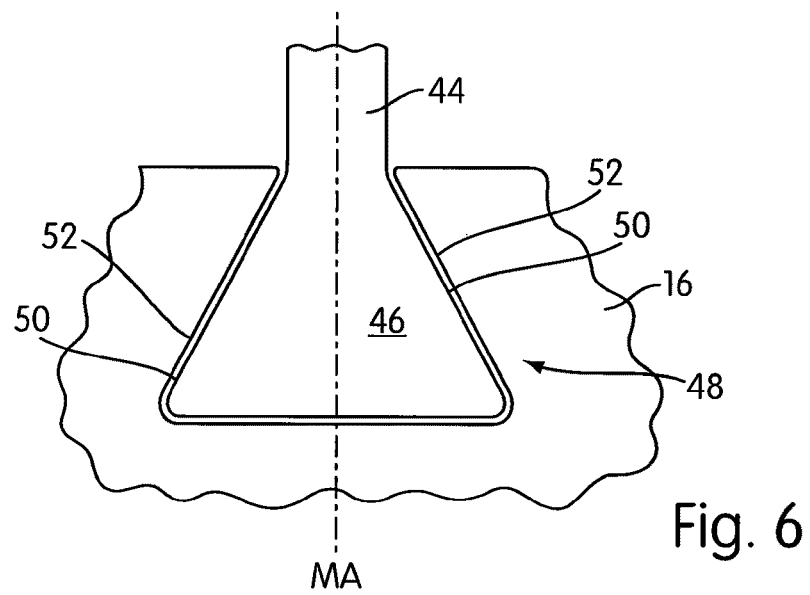
FIG. 6 illustrates a connection between the spacer of FIG. 5 and the electrode holder of FIG. 3 in greater detail.

In the embodiment illustrated in FIG. 5, each spacer has an elongated middle portion 44, and a shaped connecting portion 46 at each end. The shaped connecting portions 46 are configured to be held by openings 48 having substantially similar shapes in the electrode holder 16, as illustrated in FIG. 6. In the illustrated embodiment, the shaped portions 46 and the openings 48 have a substantially triangular shape, although the illustrated shape is not intended to be limiting in any way. The substantially triangular shape provides surfaces 50 on opposite sides of the elongated portion 44 of the spacer 40 that are configured to contact corresponding surfaces 52 on the electrode holder 16. Because the surfaces 50, 52 are angled with respect to a major axis MA of the elongated portion 44 of the spacer 40 and the tension in the spacer 40 will be along the major axis MA, the forces created by the tension may be distributed across a larger surface, as compared to a shaped portion having a circular or square shape with the same area.

Once the spacers 40 have been connected to the electrode holder 16 via the end portions 46, the flow lanes 42 are defined across the cavity 18 of the electrode holder 16. The spacers 40 are configured to essentially seal off one flow lane 42a from an adjacent flow lane 42b, that is separated by one of the spacers 40 so that the ionically conductive medium is guided to generally flow in substantially one direction. Specifically, the ionically conductive medium may generally flow in a first direction FD across the first electrode 12, from the inlet channel 24 to the outlet channel 26. A suitable pressure drop is generated between the inlet channel 24 and the fluidization zones 28 so that the ionically conductive medium may flow across the cavity 18 and to the outlet channel 26, even when the cell 10 is oriented such that the flow is substantially upward and against gravity. In an embodiment, the ionically conductive medium may also permeate through the first electrode 12, or an individual permeable electrode body 12a-12c, in a second direction SD and into a flow lane that is on the opposite side of the first electrode 12 or permeable electrode body 12a-12c.

Figure 8:
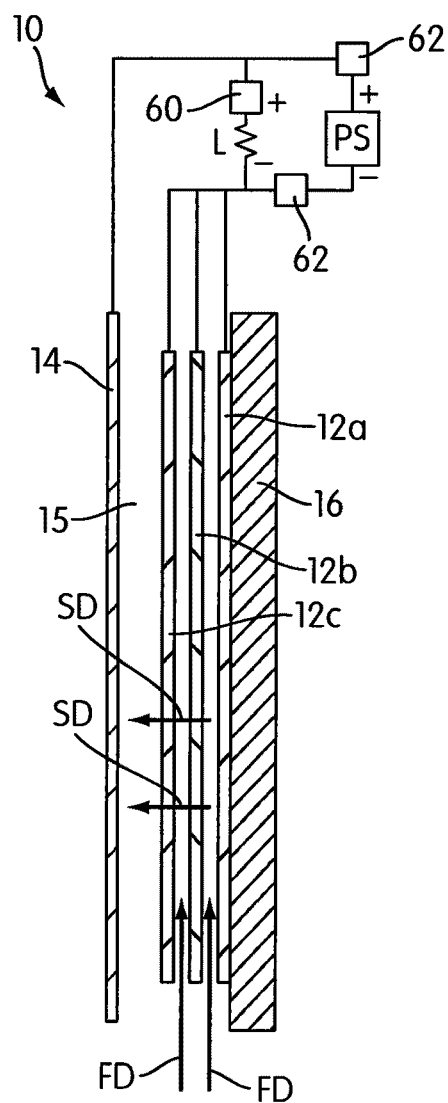
FIG. 8 schematically illustrates electrical connections between the electrochemical cell and an external load and a power supply according to an embodiment of the present invention.

As illustrated in FIG. 8, the first electrode 12 is connected to an external load L so that electrons given off by the fuel as the fuel is oxidized at the first electrode 12 flow to the external load L. The external load L may be coupled to each of the permeable electrode bodies 12a-12c in parallel, as described in detail in U.S. patent application Ser. No. 12/385,489, filed on Apr. 9, 2009 and incorporated herein by reference.

The second electrode 14 functions as a cathode when the second electrode 14 is connected to the external load L and the cell 10 operates in discharge mode. When functioning as a cathode, the second electrode 14 is configured to receive electrons from the external load L and reduce an oxidizer that contacts the second electrode 14. In an embodiment, the second electrode 14 comprises an air breathing electrode and the oxidizer comprises oxygen in the surrounding air.

The oxidizer may be delivered to the second electrode 14 by a passive transport system. For example, where oxygen present in ambient air is the oxidizer, simply exposing the second electrode 14 to ambient air via openings in the cell, such as the openings that are provided by grooves 54 in the cover 19 and grooves 56 in the electrode holder 16 provided in the center of the electrochemical cell system 100, may be sufficient to allow diffusion/permeation of oxygen into the second electrode 14. Other suitable oxidizers may be used and embodiments described herein are not limited to the use of oxygen as the oxidizer. A peripheral gasket 15 may be positioned between the periphery of the second electrode 14 and the cover 19 or electrode holder 16, as appropriate, to prevent the ionically conductive medium from leaking around the second electrode 14 and into the area in the grooves 54, 56 for air exposure.

In other embodiments, a pump, such as an air blower, may be used to deliver the oxidizer to the second electrode 14 under pressure. The oxidizer source may be a contained source of oxidizer. Likewise, when the oxidizer is oxygen from ambient air, the oxidizer source may be broadly regarded as the delivery mechanism, whether it be passive or active (e.g., pumps, blowers, etc.), by which the air is permitted to flow to the second electrode 14. Thus, the term "oxidizer source" is intended to encompass both contained oxidizers and/or arrangements for passively or actively delivering oxygen from ambient air to the second electrode 14.

Electricity that can be drawn by the external load L is generated when the oxidizer at the second electrode 14 is reduced, while the fuel at the first electrode 12 is oxidized to an oxidized form. The electrical potential of the cell 10 is depleted once the fuel at the first electrode 12 is entirely oxidized or oxidation is arrested due to passivation of the fuel electrode. A switch 60 may be positioned in between the second electrode 14 and the load L so that the second electrode 14 may be connected and disconnected from the load L, as desired.

To limit or suppress hydrogen evolution at the first electrode 12 during discharge mode and during quiescent (open circuit) periods of time, salts may be added to retard such a reaction. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution.

After the fuel in the cell 10 has been entirely oxidized, or whenever it is desirable to regenerate the fuel within the cell 10 by reducing the oxidized fuel ions back to fuel, the first electrode 12 and the second electrode 14 may be decoupled from the external load L and coupled to a power supply PS with the use of suitable switches 62, as illustrated in FIG. 8. The power supply PS is configured to charge the cell 10 by applying a potential difference between the first electrode 12 and the second electrode 14 such that the reducible species of the fuel is reduced and electrodeposited onto the permeable electrode bodies 12a-12c and the corresponding oxidation reaction takes place at the second electrode 14, which is typically oxidation of an oxidizable species to evolve oxygen, which may be off-gassed from the cell 10. As described in detail in U.S. patent application Ser. No. 12/385,489, filed on Apr. 9, 2009 and incorporated herein by reference, only one of the permeable electrode bodies, such as 12a, may be connected to the power supply PS so that the fuel reduces onto the permeable electrode body and progressively grows to and on the other permeable electrode bodies 12b-12c, one by one. The switches 62 may control when the cell 10 operates in discharge mode and in charge mode.

Any suitable control mechanism may be provided to control the action of the switches 62 between the open and closed positions. For example, a relay switch that is biased toward the open position may be used, with an inductive coil coupled to the power supply that causes closure of the switch when charging begins. Further, a more complex switch that allows for individual connection to the permeable electrode bodies 12a-12c could be used to provide the connection/disconnection to and from the load, and to and from each other.

Figure 9:
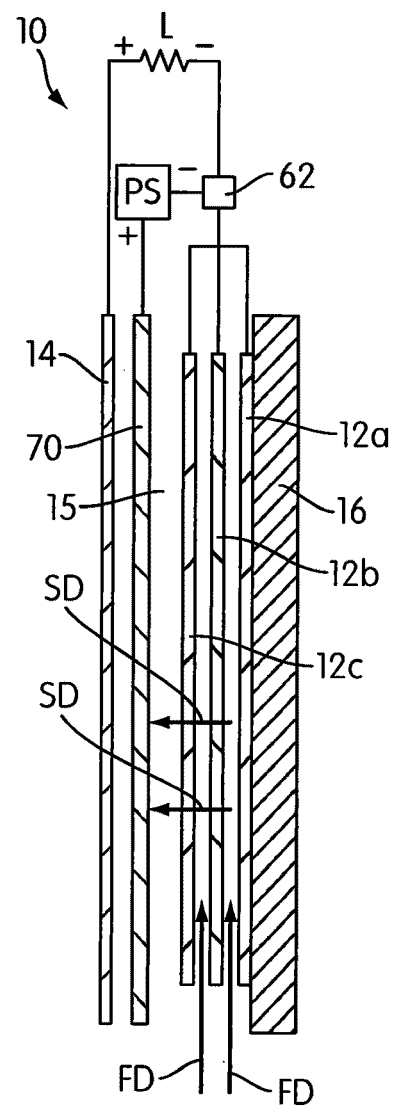
FIG. 9 schematically illustrates electrical connections between the electrochemical cell and an external load and a power supply according to an embodiment of the present invention.

FIG. 9 shows an embodiment where a third electrode 70 is provided to function as the charging electrode, rather than the second electrode 14. As illustrated in FIG. 2, the third electrode 70 may be positioned between the first electrode 12 and the second electrode 14, with a spacer 72 and the seal member 17 being positioned between the third electrode 70 and the second electrode 14. The spacer 72 is non-conductive and has openings through which the ionically conductive medium may flow.

In the embodiment described above with respect to FIG. 8, the second electrode 14 functions as the cathode during power generation/discharge, and as the anode during charging, as described above. In FIG. 9, the load is coupled in parallel to each of the permeable electrode bodies 12a-12c of the first electrode 12, and also to the third electrode 70 during recharge. During current generation, the fuel on the first electrode 12 is oxidized, generating electrons that are conducted to power the load L and then conducted to the second electrode 14 for reduction of the oxidizer (as discussed in more detail above).

It is also possible in any of the embodiments of the invention to apply the cathodic potential simultaneously to all the electrode bodies 12a-12c of the first electrode 12, rather than to just one to produce body-by-body progressive growth. Progressive growth emanating from one terminal is advantageous because it provides more density. Specifically, the growth in the previously connected electrode bodies continues as each subsequent body is connected by the progressing growth. With all the electrode bodies subject to the same potential, the growth will only occur until a short occurs between the charging electrode, which is the second electrode 14 in the embodiment of FIG. 8 and the third electrode 70 in the embodiment of FIG. 9, and the electrode body proximate to it. Thus, it is possible to have a faster, but less dense, growth in this manner, which may be amenable to certain re-charging needs.

The embodiments illustrated in FIGS. 8 and 9 should not be considered to be limiting in any way and are provided as non-limiting examples of how the cell 10 may be configured to be rechargeable. For example, U.S. Provisional Patent Application Ser. No. 61/243,970, filed on Sep. 18, 2009, and U.S. patent application Ser. No. 12/885,268, filed Sep. 17, 2010, the entire contents of both of which are incorporated herein by reference, describe embodiments of a rechargeable electrochemical cell system with charge/discharge mode switching in the cells.

In addition, any of the embodiments of the switches described above (e.g., to enable the charge mode, and discharge mode) may also be used with a plurality of electrochemical cells having a dynamically changing oxygen evolving (i.e., charging) electrode/fuel electrode, such as the progressive one described in U.S. Patent Application Ser. No. 61/383,510, filed Sep. 16, 2010 and incorporated in its entirety herein by reference. For example, as described in U.S. Provisional Patent Application Ser. No. 61/383,510, each cell 10 may also have its own plurality of switches associated with the electrode bodies to enable progressive fuel growth.

For example, in an embodiment, during charging, the charging electrode of each cell 10 may be coupled to the first electrode 12 of the subsequent cell 10. In an embodiment, during charging, a first electrode body 12a of the first electrode 12 may have a cathodic potential and the rest of the electrode bodies and/or a separate charging electrode may have an anodic potential. In such an embodiment, during the progressive fuel growth of the first electrode 12, the fuel may grow on the first electrode body 12a having the cathodic potential and cause a short with the adjacent electrode body 12b having the anodic potential. The adjacent electrode body 12b may then be disconnected from the source of anodic potential such that through electrical connection, the adjacent electrode body 12b also has the cathodic potential. This process may continue with the rest of the electrode bodies until no further growth is possible (i.e., the cathodic potential has shorted to the last electrode body having an anodic potential or a separate charging electrode). A plurality of switches may be provided to connect/disconnect the electrode bodies to one another and/or to sources of cathodic or anodic potential. Thus, in such embodiments having progressive fuel growth, the charging electrode may be a separate charging electrode from the first electrode 12 or may be at least the adjacent electrode body of the first electrode 12, up to all the other electrode bodies, having an anodic potential. In other words, the charging electrode may be a separate charging electrode, an electrode body having an anodic potential located adjacent to the at least one electrode body having a cathodic potential, and/or a group of electrode bodies having an anodic potential located adjacent to the at least one electrode body having a cathodic potential.

Thus, the charging electrode, as that term is used in the broader aspects of this application, need not necessarily be a static or dedicated electrode that only plays the anodic charging role (although it may be), and it may at times be a body or bodies within the fuel electrode to which an anodic potential is applied. Hence, the term dynamic is used to refer to the fact that the physical element(s) functioning as the charging electrode and receiving an anodic potential during charging may vary.

During discharging, the second electrode 14 of a cell 10 may be operatively connected to the first electrode 12 of the subsequent cell 10 and fuel consumption would be through the electrode bodies (wherein the electrical connection between the electrode bodies are through fuel growth). If a cell 10 is not functioning properly or for other reasons, the cell 10 may also be bypassed using the bypass switching features, as described in U.S. patent application Ser. No. 12/885,268.

Also, in some embodiments, the cells may be designed as "bi-cells." That term refers to a pair of air electrodes that are on opposing sides of a fuel electrode. During discharge, the air electrodes are at generally the same cathodic potential and the fuel electrode is at an anodic potential. Typically, a pair of dedicated charging electrodes may be disposed in the ionically conductive medium between the air electrodes and the fuel electrode. During charging, the charging electrodes are at generally the same anodic potential, and the fuel electrode is at a cathodic potential (alternatively, the charging electrode may dynamically charge, as described above). Thus, the air electrodes may share a common terminal, and the fuel electrode has its own terminal, and the charging electrodes may also share a common terminal. As such, electrochemically speaking, such a bi-cell may be regarded as a single cell (although within the bi-cell, certain aspects of the cell, such as bi-directional fuel growth, may cause a bi-cell to be considered as two cells for certain purposes; however, at a higher level for mode discharging and connection management, those aspects are less relevant and the bi-cell can be viewed as a single cell). In an embodiment, the pair of air electrodes may correspond to the second electrode 12, the fuel electrode may correspond to the first electrode 12, and the pair of charging electrodes may correspond to the third electrode 70.

Returning to FIG. 4, after the ionically conductive medium has passed through the first electrode 12, the medium may flow into the outlet channel 26 that is connected to the outlets 36 of the cavity 18 of the electrode holder 16 and the outlet 22. The outlet 22 may be connected to the inlet 20 in embodiments where the medium is recirculated in the cell 10, or to an inlet of an adjacent cell, as discussed in further detail below, when a plurality of cells 10 are fluidly connected in series. In an embodiment, the outlet 22 may be connected to a vessel to collect the medium that has been used in the cell 10.

The cells 10 illustrated in FIGS. 1 and 2 may be fluidly connected in series. Details of embodiments of cells that are connected in series are provided in U.S. Provisional Patent Application Ser. No. 61/193,540, filed Dec. 5, 2008, and U.S. patent application Ser. No. 12/631,484, filed Dec. 4, 2009, both of which are incorporated herein by reference in their entireties. The outlet 22 of a first cell 10 may be fluidly connected to the inlet 20 of a second cell 10, and the outlet 22 of the second cell 10 may be connected to the inlet 20 of a third cell, and so on. Although the embodiment of FIGS. 1 and 2 illustrates two cells 10, additional cells may be stacked and fluidly connected to the illustrated cells. Due to the meandering, tortuous paths that are created by the inlet channel 24 and the outlet channel 26, described above and illustrated in FIGS. 3 and 4, the length of the flow passageways for the medium via the channels 24, 26 is greater than the distance between the first electrode 12 and the second electrode 14 in each of the cells 10. This creates an ionic resistance between the pair of fluidly connected cells that is greater than an ionic resistance within an individual cell 10. This may reduce or minimize internal ionic resistance loss of the stack of cells 100, as discussed in U.S. Provisional Patent Application Ser. No. 61/193,540, filed Dec. 5, 2008, and U.S. patent application Ser. No. 12/631,484, filed Dec. 4, 2009.

In operation, the first electrode 12, which already has metal fuel deposited thereon, is connected to the load L and the second electrode 14 is connected to the load L. The ionically conductive medium enters the inlet 20 under positive pressure and flows through the inlet channel 24, the inlets 34 of the cavity 18, and into the fluidization zones 28 of the flow lanes 42. The ionically conductive medium flows across the permeable electrode bodies 12a-12c in the flow lanes 42 defined by the elongated middle portions 22 of the spacers 40. The ionically conductive medium may also permeate through the permeable electrode bodies 12a-12c of the first electrode 12. The ionically conductive medium simultaneously contacts the first electrode 12 and the second electrode 14, thereby allowing the fuel to oxidize and conduct electrons to the load L, while the oxidizer is reduced at the second electrode 14 via the electrons that are conducted to the second electrode 14 by the load L. After the ionically conductive medium has passed through the flow lanes 42, the medium flows out of the cavity 18 via the outlets 36 of the cavity 18, through the outlet channel 24, and out the outlet 22 of the cell 10.

When the potential of the cell 10 has been depleted or when it is otherwise desirable to recharge the cell 10, the first electrode 12 is connected to the negative terminal of the power supply PS and the charging electrode, which is the second electrode 14 in the embodiment illustrated in FIG. 8 and the third electrode 70 in the embodiment illustrated in FIG. 9, is connected to the positive terminal of the power supply PS. In the charging or recharge mode, the first electrode 12 becomes the cathode and the charging electrode 14, 70 becomes the anode. By providing electrons to the first electrode 12, fuel ions may reduce into fuel and redeposit onto the permeable electrode bodies 12a-12c while the ionically conductive medium circulates through the cell 10 in the same manner as described above with respect to the discharge mode.

The flow lanes 42 provide directionality, a uniform flow pattern, and even distribution of the ionically conductive medium across the first electrode 12. The fluidization zones 28 agitate the particulates and any precipitates that have been formed during discharge mode of the cell 10 within the ionically conductive medium and prevent the particulates from settling out of the medium at the bottom of the cavity, which allows the particulates to flow with the ionically conductive medium across the first electrode 12. The flow lanes 42 may also prevent the particulates from settling and/or covering the electrodes. When the cell 10 is in charging mode, the improved distribution of the particulates across the first electrode 12 allow for a more uniform deposition of the reduced fuel onto the first electrode 12, which improves the density of the fuel on the first electrode 12, and increases the capacity and energy density of the cell 10, thereby enhancing the cycle-life of the cell 10. In addition, by having the ability to control the distribution of the particulates or reaction by-products during discharge, early passivation/deposition of the by-product on the first electrode 12 may be prevented. Passivation leads to lower fuel utilization and lower cycle life, which is undesirable.

Figure 10:
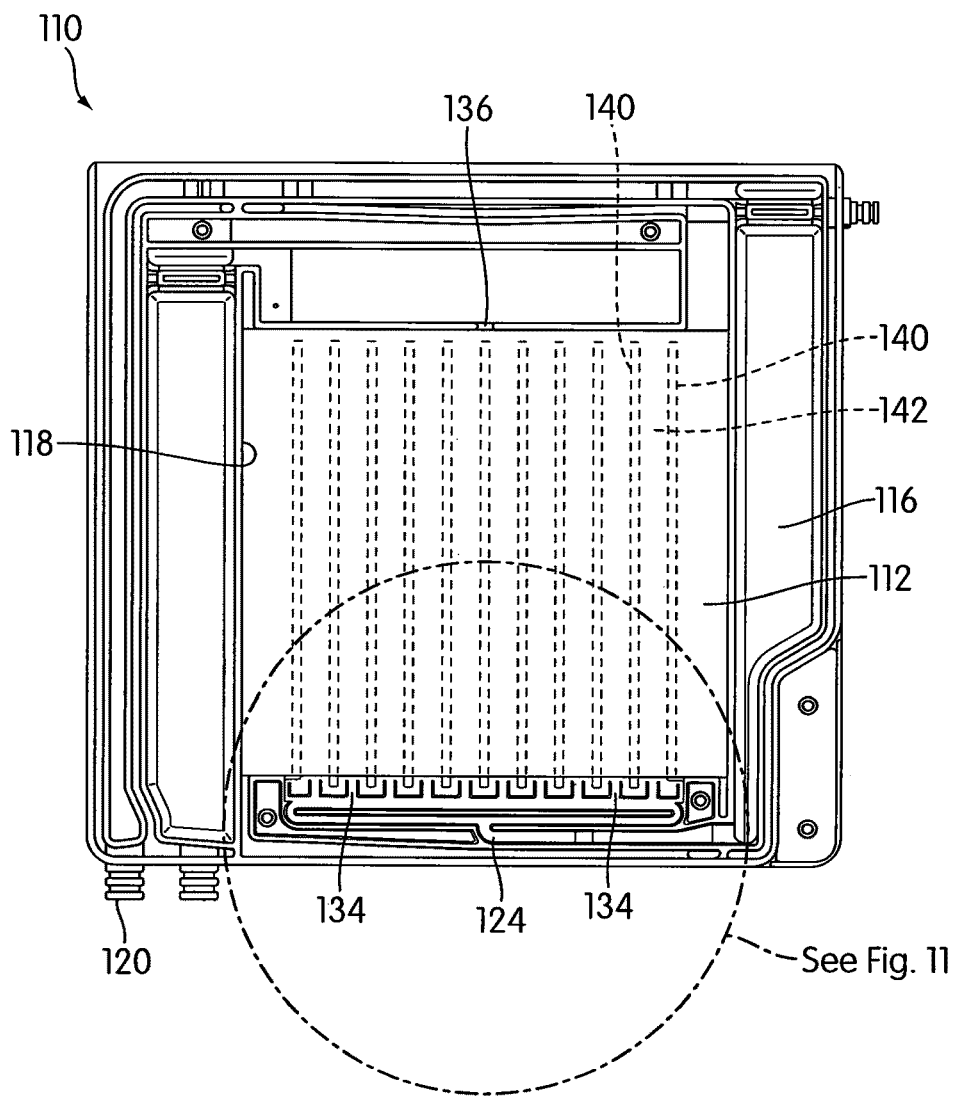
FIG. 10 illustrates an embodiment of a portion of another electrochemical cell according to an embodiment of the present invention.
Figure 11:
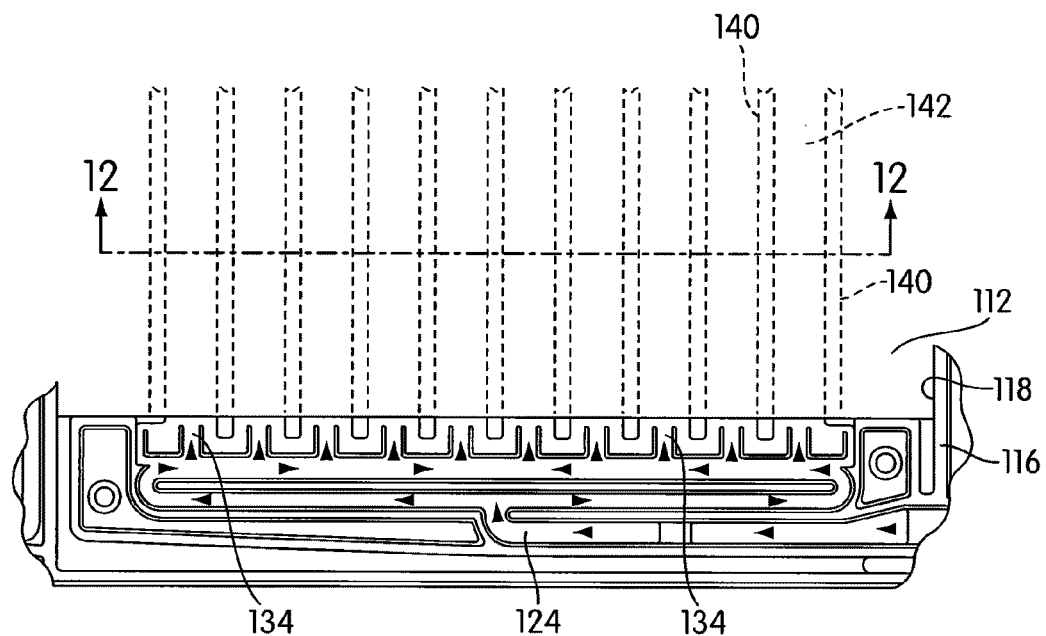
FIG. 11 illustrates Detail A of FIG. 10.
Figure 12:
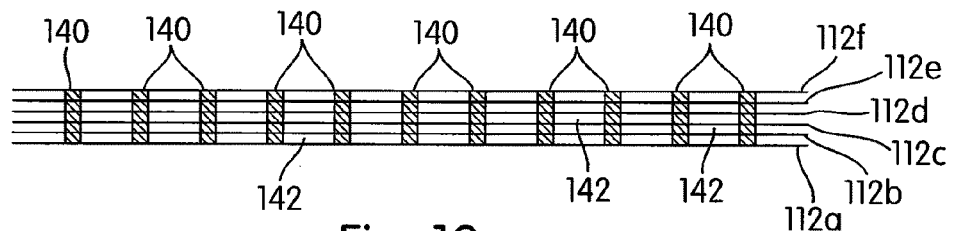
FIG. 12 illustrates a cross-sectional view of an electrode taken along line XII-XII in FIG. 11.

FIGS. 10-12 illustrate an electrochemical fuel cell 110 according to another embodiment of the present invention. The cell 110 illustrated in FIGS. 10-12 generally includes the same features as the cell 10 described above, with the exception of the first electrode, the spacers, and the electrode holder. Therefore, only these features are described in detail below. For example, as illustrated in FIG. 10, the cell 110 includes a first electrode 112 positioned in a cavity 118 of an electrode holder 116 so that it is supported by the electrode holder 116, and a plurality of spacers 140 that create flow lanes 142 in the first electrode 112.

In an embodiment, the first electrode 112 is a metal fuel electrode that functions as an anode when the cell 110 operates in discharge, or electricity generating, mode, as discussed in further detail below. In an embodiment, the first electrode 112 may comprise a plurality of permeable electrode bodies 112a-112f, as illustrated in FIG. 12. Each electrode body may include a screen that is made of any formation that is able to capture and retain, through electrodepositing, or otherwise, particles or ions of metal fuel from an ionically conductive medium that circulates in the cell 110.

The plurality of spacers 140, each of which extends across the first electrode 112 in a spaced relation to each other, may be connected to the electrode holder 116 so that the first electrode 112 may be held in place relative to the electrode holder 116 and to the second electrode (not shown in FIGS. 10-12). The permeable electrode bodies 112a-112f, as illustrated in FIG. 12, may be separated by sets of the plurality of spacers 140, so that each set of spacers 140 is positioned in between adjacent electrode bodies to electrically isolate the electrode bodies 112a-112f from each other. Within each set of spacers 140 between adjacent electrode bodies, the spacers 40 are positioned in a spaced relation in a manner that creates the so-called "flow lanes" 142 therebetween. The spacers 140 are non-conductive and electrochemically inert so they are inactive with regard to the electrochemical reactions in the cell 110. The spacers 140 may be made from a suitable plastic material, such as polypropylene, polyethylene, polyester, etc. Similar to the flow lanes 42 described above, the flow lanes 142 are three-dimensional and have a height that is substantially equal to the height of the spacers 140, as illustrated in FIG. 12.

In the illustrated embodiment, the cavity 118 has a generally square shape that substantially matches the shape of the first electrode 112. One side or end of the cavity 118 is connected to a inlet channel 124 via a plurality of cavity inlets 134. The inlet channel 124 is connected to an inlet 120 through which the ionically conductive medium enters the cell 110. Each cavity inlet 134 is substantially aligned with a corresponding flow lane, as illustrated in FIG. 11. After the ionically conductive medium has flowed through the flow lanes 142, the ionically conductive medium may exit the cavity 118 through a cavity outlet 136, which is illustrated in FIG. 10.

The permeable bodies 112a-112f and the spacers 140 may be formed as a single unit prior to the first electrode 112 being placed in the electrode holder 116. In other words, the first electrode illustrated in FIG. 12 may be formed as a single unit using any suitable manufacturing process. For example, in an embodiment, manufacturing spacers (not shown) that are substantially the size of the desired flow lanes 142 may be placed between adjacent permeable bodies 112a-112f to hold the adjacent permeable electrode bodies 112a-112f in a substantially parallel spaced relation. The manufacturing spacers that are located between the same adjacent permeable electrode bodies are preferably substantially parallel to each other and equally spaced long the electrode bodies 112a-112f, and the manufacturing spacers that are located on opposite sides of the same electrode body are preferably substantially aligned with each other. After the electrode bodies 12a-12f and manufacturing spacers are in place and held together by any suitable means, a suitable material to be used for the spacers 140 may be injected in between the manufacturing spacers and through the permeable electrode bodies 112a-112f. After the material hardens or cures, the manufacturing spacers may be removed from the first electrode 112 to create the single electrode scaffold unit 112 illustrated in FIG. 12.

In an embodiment, an injection mold may be fabricated such that the manufacturing spacers are part of the mold. Slots may be formed in the mold to accommodate the permeable electrode bodies 112a-112f, and cavities defining the volumes for the spacers 140 may also be formed. Each of the electrode bodies 112a-112f may be inserted into the mold in a parallel spaced relation to an adjacent body, and the material to be used for the spacers 140 may then be injected into the cavities to form the spacers 140. After the material has cooled in the mold, the first electrode 112 may be ejected from the mold as a single unit containing the permeable electrode bodies 112a-112f and the spacers 140. Of course, any suitable manufacturing method that allows the spacers 140 to be integrally formed on and through the permeable electrode bodies 112a-112f so that the first electrode 112 comprising the electrode bodies 112a-112f and the spacers are a single unit may be used. The above-described methods are not intended to be limiting in any way.

Like the permeable electrode bodies 12a-12c described above, in an embodiment, the permeable electrode bodies 112a-112f may have substantially the same size. In an embodiment, the permeable electrode bodies 112a-112f may have different sizes so that a stepped scaffold configuration may be used, as described by U.S. Provisional Patent Application Ser. No. 61/358,339, filed Jun. 24, 2010.

Embodiments of the present invention are not limited to the management of the reaction by-product that is generated during discharge mode, as described above, and reversibly reduced and electrodeposited as the fuel during recharge. Rather, embodiments of the present invention can be used where the reducible fuel species is different from the reaction by-product and is supplied separately. Embodiments of the present invention provide a uniform flow pattern of the ionically conductive medium across the first electrode, and an even distribution of the ionically conductive medium between the permeable electrode bodies that make up the first electrode, which may improve the efficiency of the electrochemical cells and systems described above.

Where electrodes are referred to herein, it should be understood that various structures in some embodiments may function as one or more electrodes in different ways depending on the operational mode of the device. For example, in some embodiments where the oxidant electrode is bi-functional as a charging electrode, the same electrode structure acts as an oxidant electrode during discharging and as a charging electrode during charging. Similarly, in the embodiment where the charging electrode is a dynamic charging electrode, all of the bodies of the fuel electrode act as the fuel electrode during discharging; but during charging one or more of the bodies act as the fuel electrode by receiving electrodeposited fuel and one or more other of the bodies act as the charging electrode to evolve the oxidant (e.g., oxygen), and the fuel electrode grows as the electrodeposited growth connects to more of the bodies. Thus, reference to an electrode is expressly defined as either a distinct electrode structure or the functional role a structure capable of multiple electrode functions may play during different operational modes of the cell (and thus the same multi-functional structure may be considered to satisfy multiple electrodes for this reason).

The foregoing illustrated embodiments have been provided solely for illustrating the structural and functional principles of the present invention and are not intended to be limiting. For example, the present invention may be practiced using different fuels, different oxidizers, different electrolytes, and/ or different overall structural configuration or materials. Thus, the present invention is intended to encompass all modifications, substitutions, alterations, and equivalents within the spirit and scope of the following appended claims.

The subject matter claimed in this application was made under a joint research agreement qualifying under 35 U.S.C. §103(c)(2) and (3) to which Fluidic, Inc. and Arizona Science and Technology Enterprises, LLC acting as the exclusive master licensee for Arizona State University are parties.

What is claimed is:

1. An electrochemical cell comprising:
a fuel electrode;
an oxidant electrode spaced from the fuel electrode;
an ionically conductive medium contacting the electrodes;
the fuel electrode and the oxidant electrode being configured to, during discharge, oxidize a metal fuel at the fuel electrode and reduce an oxidant at the oxidant electrode to generate a discharge potential difference therebetween for application to a load;
an electrode holder comprising a cavity for holding the fuel electrode, at least one inlet connected to the cavity on one side of the cavity and configured to supply the ionically conductive medium to the cavity, and at least one outlet connected to the cavity on an opposite side of the cavity as the at least one inlet and configured to allow the ionically conductive medium to flow out of the cavity; and
a plurality of spacers extending across the fuel electrode and the cavity in a spaced relation from each other to define a plurality of flow lanes in the cavity so that the ionically conductive medium flows into each flow lane via the at least one inlet, across the fuel electrode, and out of the flow lane via the at least one outlet,
wherein the fuel electrode comprises a plurality of permeable bodies in spaced relation and wherein the plurality of spacers are provided in between the permeable bodies to allow the ionically conductive medium to permeate through the permeable bodies and to flow across the permeable bodies in the flow lanes, further comprising a charging electrode, wherein the fuel electrode and the charging electrode are configured to, during re-charge, reduce a reducible species of the fuel to electrodeposit the fuel on the fuel electrode and oxidize an oxidizable species of the oxidant by application of a re-charge potential difference therebetween from a power source.

2. An electrochemical cell according to claim 1, wherein the charging electrode is selected from the group consisting of (a) the oxidant electrode, (b) a third electrode spaced from the oxidant electrode, and (c) a portion of the fuel electrode.

3. An electrochemical cell according to claim 2, wherein the charging electrode during re-charge is a dynamic charging electrode comprising at least one of the permeable electrode bodies.

4. An electrochemical cell according to claim 1, wherein each spacer is attached at opposite ends thereof to the electrode holder in tension to secure the fuel electrode to the electrode holder.

5. An electrochemical cell according to claim 4, wherein each spacer comprises an elongated center portion and a shaped end portion at each end of the elongated center portion, and wherein the electrode holder comprises a plurality of shaped openings that correspond to the shaped end portions of the spacers so that the ends of each spacer may be held by the shaped openings in the electrode holder.

6. An electrochemical cell according to claim 5, wherein the shaped end portions and shaped openings have a substantially triangular shape.

7. An electrochemical cell according to claim 1, wherein the at least one inlet comprises a plurality of inlets, wherein the at least one outlet comprises a plurality of outlets, and wherein one of the plurality of inlets and one of the plurality of outlets are associated with reach flow lane so that the ionically conductive medium flows into each flow lane via the associated inlet, across the fuel electrode, and out of the flow lane via the associated outlet.

8. An electrochemical cell according to claim 7, wherein the cavity comprises diverging surfaces at the inlet of each flow lane, the diverging surfaces partially defining a volume in which particulates in the flow lane are fluidized with the ionically conductive medium flowing into the flow lane.

9. An electrochemical cell according to claim 1, wherein the inlets are configured to provide a pressure drop between an inlet channel in the electrode holder and the flow lanes.

10. An electrochemical cell according to claim 1, wherein each flow lane is three-dimensional and has a height substantially equal to the spacers that define the flow lane.

11. An electrochemical cell according to claim 1, wherein the fuel when oxidized during discharge forms an oxide in the ionically conductive medium.

12. An electrochemical cell according to claim 1, wherein each spacer is molded into or onto the fuel electrode.

13. An electrochemical cell according to claim 1, wherein the plurality of spacers are molded into or onto the permeable bodies to hold the permeable bodies in the spaced relation.

14. A method for charging an electrochemical cell, the electrochemical cell comprising
a fuel electrode;
an oxidant electrode spaced from the fuel electrode;
a charging electrode;
an ionically conductive medium contacting the electrodes;
the fuel electrode and the oxidant electrode being configured to, during discharge, oxidize a metal fuel at the fuel electrode and reduce an oxidant at the oxidant electrode to generate a discharge potential difference therebetween for application to a load;
the fuel electrode and the charging electrode being configured to, during re-charge, reduce a reducible species of the fuel to electrodeposit the fuel on the fuel electrode and oxidize an oxidizable species of the oxidant by application of a re-charge potential difference therebetween from a power source;
an electrode holder comprising a cavity for holding the fuel electrode, at least one inlet connected to the cavity on one side of the cavity and configured to supply the ionically conductive medium to the cavity, and at least one outlet connected to the cavity on an opposite side of the cavity as the at least one inlet and configured to allow the ionically conductive medium to flow out of the cavity; and
a plurality of spacers extending across the fuel electrode and the cavity in a spaced relation from each other to define a plurality of flow lanes in the cavity so that the ionically conductive medium flows into each flow lane via the at least one inlet, across the fuel electrode, and out of the flow lane via the at least one outlet,
wherein the fuel electrode comprises a plurality of permeable bodies in spaced relation, and wherein the plurality of spacers are provided in between the permeable bodies to allow the ionically conductive medium to permeate through the permeable bodies and to flow across the permeable bodies in the flow lanes,
the method comprising:
flowing the ionically conductive medium comprising reducible fuel species through the at least one inlet and into the flow lanes;
applying an electrical current between the charging electrode and the fuel electrode with the charging electrode functioning as an anode and the fuel electrode functioning as a cathode, such that the reducible fuel species are reduced and electrodeposited as fuel in oxidizable form on the fuel electrode; and
removing the electrical current to discontinue the charging.

15. A method for charging according to claim 14, wherein the charging electrode is selected from the group consisting of (a) the oxidant electrode, (b) a third electrode spaced from the oxidant electrode, and (c) a portion of the fuel electrode.

16. An electrochemical cell according to claim 15, wherein the charging electrode is a dynamic charging electrode and comprises at least one of the permeable electrode bodies during re-charge.

17. A fuel electrode for an electrochemical cell comprising: the fuel electrode; an oxidant electrode spaced from the fuel electrode; an ionically conductive medium contacting the electrodes; the fuel electrode and the oxidant electrode being configured to, during discharge, oxidize a metal fuel at the fuel electrode and reduce an oxidant at the oxidant electrode to generate a discharge potential difference therebetween for application to a load; and an electrode holder comprising a cavity for holding the fuel electrode, at least one inlet connected to the cavity on one side of the cavity and configured to supply the ionically conductive medium to the cavity, and at least one outlet connected to the cavity on an opposite side of the cavity as the at least one inlet and configured to allow the ionically conductive medium to flow out of the cavity; the fuel electrode comprising:
a plurality of permeable bodies in spaced relation, and
a plurality of spacers extending across the fuel electrode in a spaced relation from each other to define a plurality of flow lanes in the cavity when the fuel electrode is in the electrochemical cell so that the ionically conductive medium flows into each flow lane via the at least one inlet, across the fuel electrode, and out of the flow lane via the at least one outlet,
wherein the plurality of spacers are provided in between the permeable bodies to allow the ionically conductive medium to permeate through the permeable bodies and to flow across the permeable bodies in the flow lanes.

18. A fuel electrode according to claim 17, wherein each spacer is molded into or onto the fuel electrode.

19. A fuel electrode according to claim 18, wherein the plurality of spacers are molded into or onto the permeable bodies to hold the permeable bodies in the spaced relation.

* * * * *